Jan. 4, 1944.   L. KISHLAR ET AL   2,338,588
METHOD OF MAKING A CEREAL FOOD PRODUCT
Filed July 16, 1941
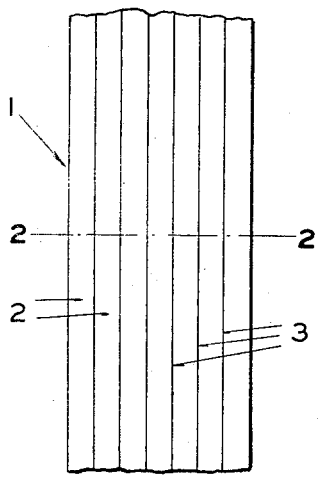
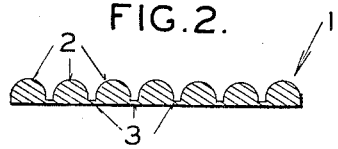
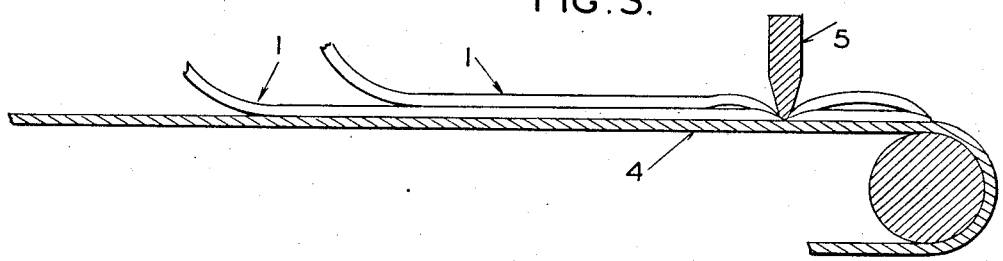
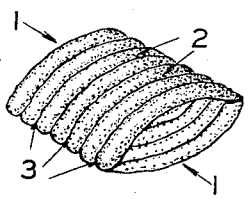
INVENTORS
LAMAR KISHLAR
CLIFTON A. COBB
FRANK JAMES
BY
ATTORNEY Patented Jan. 4, 1944

2,338,588

UNITED STATES PATENT OFFICE 2,338,588

METHOD OF MAKING CEREAL FOOD PRODUCTS

Lamar Kishlar, Webster Groves, Clifton A. Cobb, University City, and Frank James, Normandy, Mo., assignors to Ralston Purina Company, St. Louis, Mo., a corporation of Missouri Application July 16, 1941, Serial No. 402,568

2 Claims. (Cl. 99—81)

Our invention is a new physical form of "ready to eat" cereal food product and the method of making the same. The product, which is of the "small biscuit" type, is characterized by lightness, friability, uniformity of texture, and a novel and especially attractive and appetizing appearance.

It may be made of rice, wheat, or corn or mixtures of these and in completed form has the appearance of a small biscuit whose top and bottom portions consist of parallel puffed shreds joined by thin webs of the material, the said top and bottom portions being joined at their ends but widely separated at their central parts giving a puffed appearance to the unit as a whole. This spacing between the elements of a unit enhances the taste sensation when chewing the product and space here during manufacture is essential to secure uniform texture throughout each unit in the puffing treatment.

Describing our new method as applied to the production of puffed rice "biscuits," the rice is cooked about ten minutes at between ten and twenty pounds of steam pressure and is then broken up and dried to about twenty-eight per cent moisture content. It is then tempered from three to four hours. After tempering the rice is formed into strips of selected width (¾ inch being suitable) by being passed between a pair of rolls such as used in making shredded wheat, for exmaple, except that the rolls are slightly spaced apart whereby the passing of the cooked rice therebetween produces a strip of dough in the form of parallel shred-like portions joined by thin web portions.

Referring to the drawing, Figure 1 illustrates a plan view of a strip of rice dough as delivered from the shredding rolls; Figure 2 is an enlarged cross-section taken on the line 2—2 of Figure 1; Figure 3 shows one strip of dough superimposed on another with means for dividing these two strips into units and causing the severed portions to adhere at their ends and to be separated at their central parts; and Figure 4 is a perspective view of the complete unit of our new product after the puffing treatment following the formation of the unit as indicated in Figure 3.

In forming our new food product only two strips 1 of shredded dough are employed, each strip comprising a number of shreds 2 joined by thin webs 3. One of these strips is superimposed on the other as they are delivered to a belt 4 from two aligned pairs of strip forming rolls. In order to secure uniformity of texture in the completed product, it is essential that substantial air space exists between the upper and lower elements of the unit whereby the blast of hot air employed in the puffing operation may come in contact with both sides of each element of the unit. Otherwise, instead of uniform puffing of the dough, the inner surfaces of the units would simply be dried to a hard brittleness as is the case in the manufacture of shredded wheat products at the present time wherein several superimposed layers of shreds are employed in the formation of a single unit of food.

We have found that the use of a thick dull knife 5 as the unit separating means causes the ends of the severed portions of the strips to adhere and also introduces stresses in the dough which cause an upward curvature of the top layer and, therefore, the formation of the air space between it and the lower layer. Any other suitable means may be employed in forming the units from the two superimposed strips of shreds. The two necessary operations of causing the ends of the units to adhere and the middle portions to be separated can obviously be achieved in a variety of ways and either manually or mechanically.

Following the division of the strips into units, the units are preferably first passed through a low temperature oven to harden the surfaces only of the shred elements and are then quickly passed through a very hot oven where they are subjected to a blast of hot air at a temperature of approximately 230° C. for fifteen seconds. This treatment causes a very uniform enlargement or puffing of the shred portions of the strips and also results in an increase in curvature of the top and bottom elements of the strips whereby, when viewed in the direction of the length of the shreds, the unit has the appearance of a puffed biscuit. Though made of a size approximately ¾ inch by ¾ inch, each unit is extremely light and when packaged, the food has large volume in relation to weight.

By the method above described the new food product can also be made of wheat or corn or from mixtures of these, it only being necessary to so cook and temper the grain or mixtures of grain as to permit the shredding rolls to form strips of dough of a texture which is suitable for the unit forming and puffing method described.

In all cases the cereal used will be flavored in a desired manner during cooking, a suitable flavoring material for addition to rice being a mixture of malt, sugar and salt in desired proportions.

Having fully described our invention, what we claim as new and desire to secure by Letters Patent of the United States is:

1. The method of producing a cereal food product which comprises cooking the cereal and forming the same while moist into strips consisting of a plurality of portions in shred form, each shred being joined to an adjacent shred by a thin web, superimposing one strip on another, dividing said two-element strip into separate units by pressing blunt severing means therethrough along lines transverse to the strip whereby the upper and lower elements are caused to adhere at their ends and are brought into spaced apart relation at a point intermediate their ends, and suddenly subjecting the units to high temperature thereby causing the space between the central portion of said elements to be enlarged and to puff the shred portions thereof.

2. The method of producing a rice food product which comprises cooking the rice in moisture, drying same to approximately 28% moisture content, and then forming the same while moist into strips consisting of a plurality of portions in shred form, each shred being joined to an adjacent shred by a thin web, superimposing one strip on another, dividing said two-element strip into separate units by pressing blunt severing means therethrough along lines transverse to the strip whereby the upper and lower elements are caused to adhere at their ends and are brought into spaced apart relation at a point intermediate their ends, and suddenly subjecting the units to high temperature thereby causing the space between the central portion of said elements to be enlarged and to puff the shred portions thereof.

LAMAR KISHLAR.
CLIFTON A. COBB.
FRANK JAMES.